United States Patent [19]

Sheiman

[11] Patent Number: 4,588,259
[45] Date of Patent: May 13, 1986

[54] STEREOSCOPIC OPTICAL SYSTEM

[75] Inventor: David M. Sheiman, Los Angeles, Calif.

[73] Assignee: Bright & Morning Star Company, Torrance, Calif. ; a limited partnership

[21] Appl. No.: 636,417

[22] Filed: Jul. 31, 1984

[51] Int. Cl.[4] .................. G02B 27/26; G02B 27/22
[52] U.S. Cl. .................................. 350/132; 358/91
[58] Field of Search .................. 350/132, 131, 130; 358/88, 91; 353/7, 8, 81; 352/60

[56] References Cited

U.S. PATENT DOCUMENTS

| 2,674,156 | 4/1954 | Mahler | 350/132 |
| 2,889,739 | 6/1959 | Moore | 350/131 |
| 2,891,444 | 6/1959 | Ewald | 350/131 |
| 3,851,955 | 12/1974 | Kent et al. | 350/132 |

FOREIGN PATENT DOCUMENTS

| 2847162 | 5/1980 | Fed. Rep. of Germany | 353/8 |
| 2272414 | 12/1975 | France | 350/131 |
| 2072874 | 10/1981 | United Kingdom | 350/132 |

Primary Examiner—Jon W. Henry
Attorney, Agent, or Firm—Plante Strauss & Vanderburgh

[57] ABSTRACT

There is disclosed a system for the stereoscopic imaging of right and left stereoscopic optical images as these images are projected and displayed on a screen or video monitor. The system uses encoded right and left stereoscopic images with corresponding decoding right and left filters through which the stereoscopic image is viewed. Either polarized or monochromatic light can be used as the right and left image coding medium. A thin face Fresnel prism is positioned between the observer or observers and the projected or displayed right and left stereoscopic images and is located to fuse the two images so that, when they are observed through the decoding filters, an illusion of a three dimensional object is created. For maximum clarity, the Fresnel prism can be vibrated parallel to the original imaging surface.

54 Claims, 12 Drawing Figures

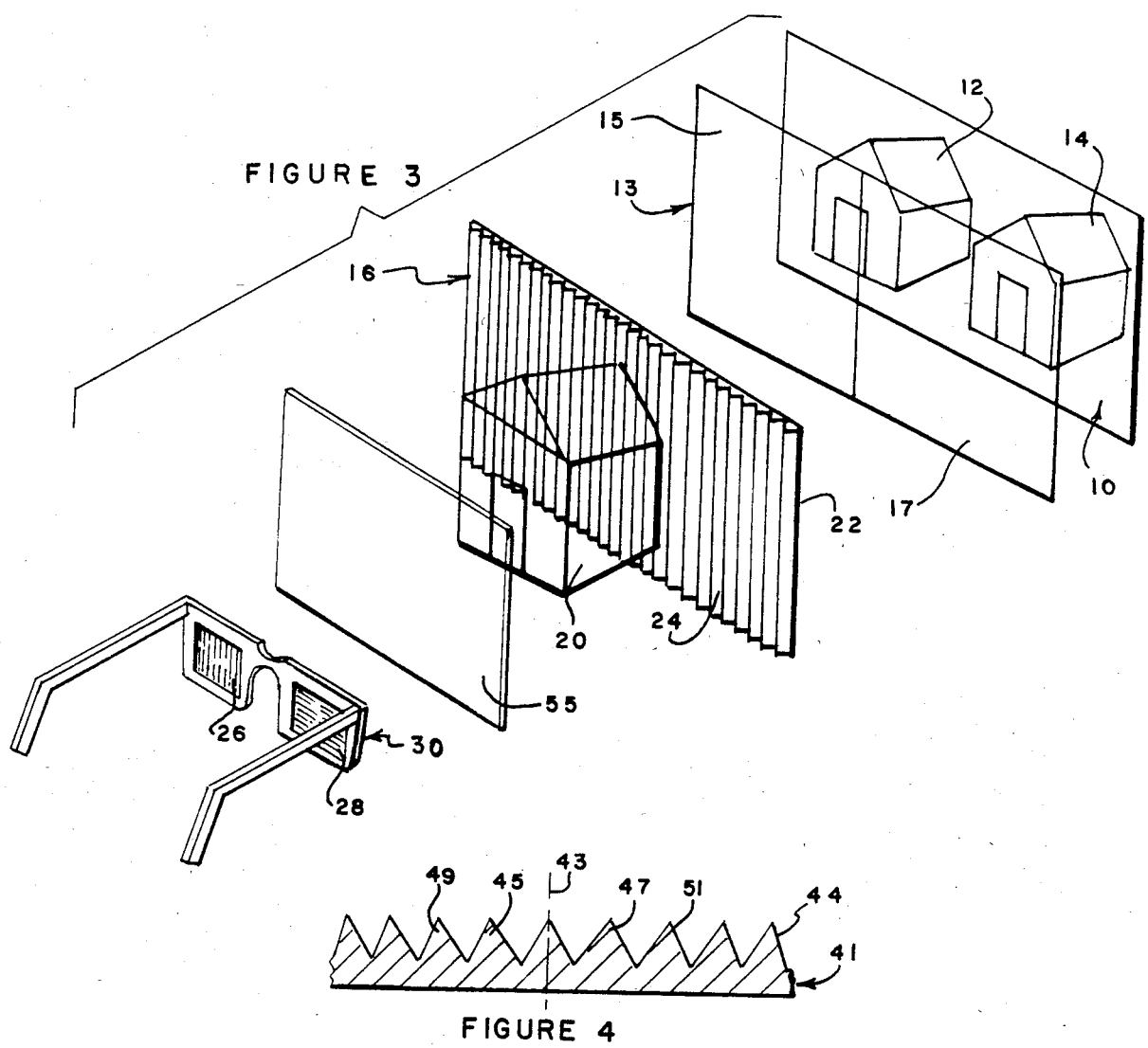
FIGURE 3
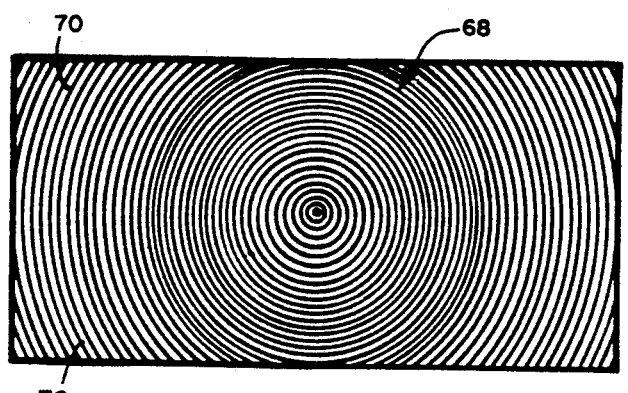
FIGURE 4
FIGURE 5

STEREOSCOPIC OPTICAL SYSTEM

BACKGROUND OF THE INVENTION

1. Field of Invention

This invention relates to optical stereoscopic systems, and in particular to a system which is adaptable to a wide variety of image transmission and projection systems.

2. Brief Statement of the Prior Art

Sheiman and Rudell in U.S. Pat. Nos. 4,235,515 and 4,222,720 describe stereoscopic image display utilizing one or two Fresnel prisms. These systems, however, are best suited for viewing by one or two observers, and require display of left and right images at ninety degrees to each other, thus restricting usage and complicating monitor displays. These systems also are not readily adaptable to display of large images. The patents describing this system do not mention or claim light encoding of any kind for image discrimination. Discrimination by an observer of each stereoscopic image is achieved by light refraction or reflection, resulting in critical positioning of the observer for correct viewing.

Swan, in U.S. Pat. No. 51,906 issued in 1866 discloses a stereoscopic image display using two, solid core, right angle prisms. This system has the same limitations as the aforementioned Sheiman and Rudell patents and, additionally is very bulky and cumbersome and further greatly limits the size of the images. This system is entirely incompatible with single monitor (CRT) display.

Baumgardner, in U.S. Pat. No. 3,972,596, describes a system utilizing a flat Fresnel lens for image magnification or compression, as in a wide angle lens application. Baumgardner's employment of Fresnel optics is for one image, and in no way infers or suggests images or image pairs for any purpose, particularly stereoscopy.

Prior stereoscopic systems have used right and left image coding with polarized or monochromatic-color light and eyepieces having polarized or colored filters worn by the observers. In all past systems, however, it had been necessary to encode the images at their projection site and to use a special screen to maintain polarity of the displayed images. These requirements have prevented application to electronic image display, e.g., television, since polarization cannot be achieved or maintained during electronic transmission or monitor display. Additionally, the stereoscopic images have typically been superimposed over each other at the point of final display and separate polarization of each image has to be performed prior to the superimposition and then maintained throughout transmission to the point of final display to a viewer or viewers. While this is acceptable in a movie theater, where polarizing elements can be positioned in front of a projection device and the separate images can undergo polarization as they pass through the elements and onto a special screen which maintains polarization, it has precluded applications in telephonic, fiber optic and electronic image transmission and broadcasting.

BRIEF STATEMENT OF THE INVENTION

This invention comprises a system for display and observation of stereoscopic optical images. In the system, right and left sterescopic images are displayed or projected onto a viewing surface, such as a projection screen, or the screen of a cathode ray tube when the images are transmitted electronically for viewing, as in a home television set or a computer monitor. The images are displayed on the screen in either a lateral, or vertical, side-by-side array and are encoded by polarized or monochromatic-color light transmission. Preferably, polarized light is employed.

The stereoscopic images are optically fused a short distance in front of the imaging surface by a Fresnel prism. The Fresnel prism is a thin prism having a plurality of parallel straight grooves on one of its faces to provide a faceted face having a plurality of spaced-apart prisms. Alternatively, the faceted face could be formed with a plurality of concentric, or helical, arcuate grooves. The prism functions by refracting the light from each image into a centrally positioned, fused image of the right and left stereoscopic individual images.

The observer views the fused image through decoding filters such as right and left polarizing light filters or right and left monochromatic-color filters whereby each eye preceives only its respective left or right stereoscopic image. The degree of resolution of the image depends on density of prisms on the Fresnel lens, however, this resolution can be enhanced by vibrating the Fresnel prism transversely to the direction of sight, i.e. parallel to the imaging surface.

The system of this invention has distinct and clearly observable advantages over any other stereoscopic display system in that the original images can be seen in full-color, in any size, and by a multiplicity of observers from any angle of view and from any distance from the imaging source. Since all encoding, and subsequent decoding of the dual images, can be performed after the images are displayed on a screen or monitor, the images need not be encoded, right and left, on input, thereby obviating costly and specifically designed input or display or projection equipment. Although this system will work with virtually any imaging format, including photographic transparencies and prints, it is particularly useful in applications with computer generated graphics or electronically broadcasted signals such as in television transmission. Additionally, this system is virtually flat, and requires little space in front of the original image display.

The system of this invention can apply all encoding and decoding steps after display of the stereoscopic images. Furthermore, the system of this invention does not require that the image pairs be displayed, overlapped or superimposed one upon the other, thus enabling an observer without any glasses to at least see normal image representation. The elimination of polarization during transmission also renders the disclosed system compatible to telephone image and fiber optic image transmission as well as to electronic transmission and broadcasting. Since the invention described herein allows for the stereoscopic images to be transmitted with no encoding, the transmission and processing of the image prior to display has no special requirements other than maintenance of side-by-side positioning of the images, and all necessary encoding of the side-by-side images can be performed after display. This permits application to CRT monitor and video displays. An inexpensive refracting Fresnel lens can be employed to superimpose the two individually polarized images in space for eventual stereoscopic viewing by any number of viewers.

The invention can thus be retro-fitted to all existing display technology without internal modification of existing equipment. Furthermore, this invention allows the immediate broadcast transmission of stereoscopic images into the home for full color display on existing television screens with only the addition of minimum external accessories described herein.

BRIEF DESCRIPTION OF THE DRAWINGS

The invention will be described with reference to the FIGURES of which:

FIG. 3 illustrates the system of FIG. 1 with the addition of a magnifying element for purposes of image enlargement;

FIG. 4 illustrates a cross-sectional view of a lens embodiment that achieves both magnification and image fusion;

FIG. 5 illustrates an alternative Fresnel prism lens design of concentric, arcuate grooves;

DESCRIPTION OF THE PREFERRED EMBODIMENTS

Figure 1:
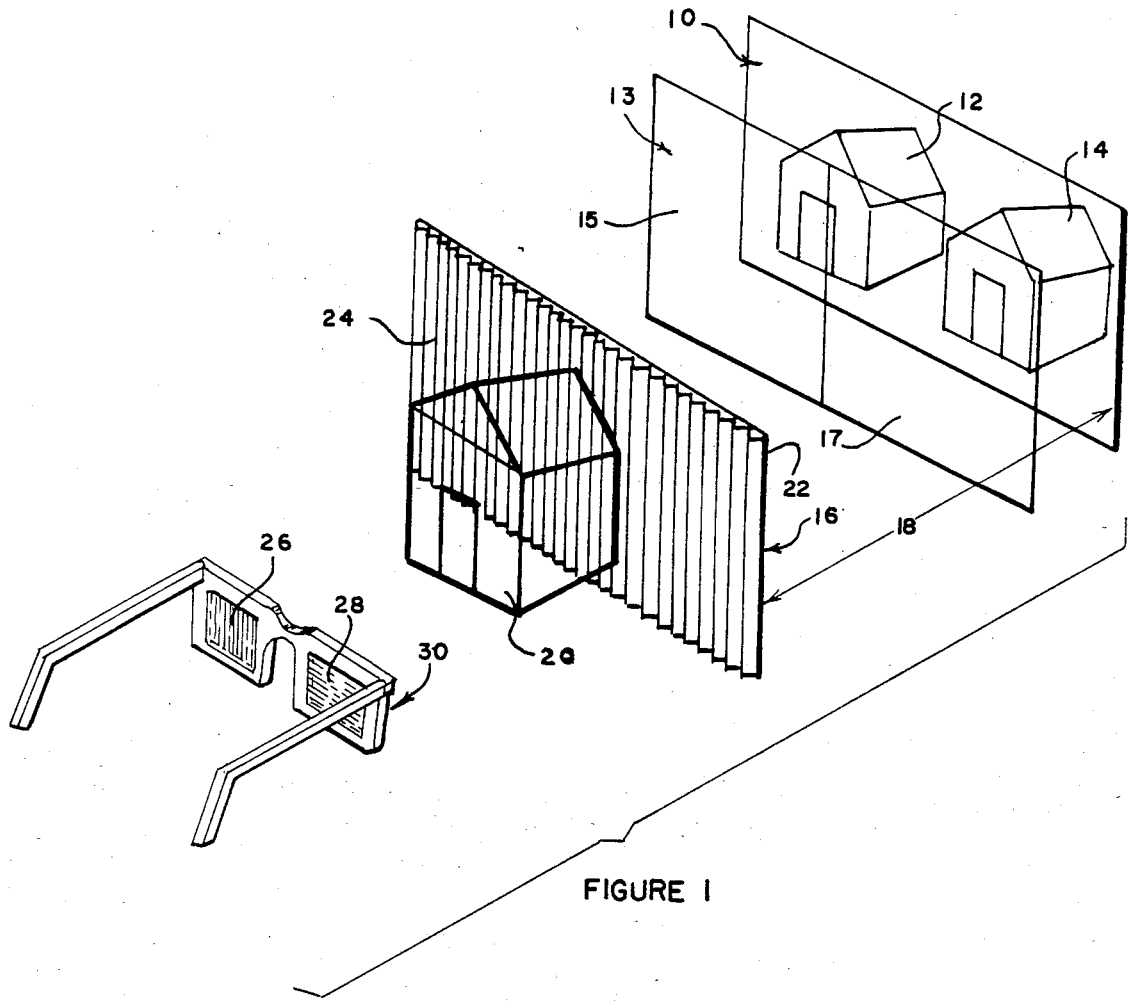
FIG. 1 is a perspective view illustrating the location of the elements of the viewing system.

Referring to FIG. 1, the invention is illustrated as including a screen 10 which can be a typical movie or slide projection screen or can be the screen of a television receiver, television projection screen or a backlighted X-ray or photographic transparency lightbox, and the like. Left stereoscopic image 12 and right stereoscopic image 14 are projected, or displayed, on screen 10. As illustrated in FIG. 1, left image 12 and right image 14 are projected or displayed on screen 10 with no prior encoding of any kind, and are encoded by filter 13 which is positioned in front of screen 10. Filter 13 comprises two, side-by-side elements, which are left element 15 and right element 17. The elements can be red and green filters respectively, or two orthogonally opposed polarizing filters. Thus the left image 12 could be displayed for observance through left polarizing filter 15 via polarized light aligned along the vertical axis, while right image 14 could be displayed for observance through right polarizing filter 17 via polarized light aligned along the horizontal axis.

Alternatively, the left stereoscopic image can be encoded using a monochromatic light filter such as a red filter while the right stereoscopic image 14 can be encoded with a monochromatic blue light filter. Regardless of the encoding technique employed, the observer utilizes corresponding decoding filters, as hereinafter described, to confine the vision of each of the observer's eyes to its respective left or right stereoscopic image 12 or 14.

The left and right stereoscopic images are fused into a unitary image by the Fresnel prism 16 which is positioned a slight distance 18 in front of the screen 10. The Fresnel prism 16 functions in a manner described with particular reference to FIG. 2 and fuses the left and right stereoscopic images 12 and 14 into the unitary image 20 which appears in space near the face of the prism 16. The Fresnel prism is described in greater detail hereinafter. Briefly, however, it comprises a thin face prism having a smooth face 22 and a faceted face 24. The faceted face 24 is formed with a plurality of substantially parallel V-grooves which subdivide the faceted face into a plurality of prisms having a triangular cross-section. In the illustrated, preferred embodiment, the V-grooves are a plurality of substantially parallel, vertical grooves extending across the entire face of the prism. Also in the preferred embodiment, these V-grooves are evenly spaced to provide, therebetween, evenly spaced, triangular prisms.

The remainder of the viewing system of FIG. 1 includes the decoding filters. In the application illustrated herein, the decoding filters are supported as left and right filters 26 and 28 which are carried in the lens frames of a binocular set of glasses 30. When polarized light is the encoding medium, each filter 26 and 28 is polarized in the same direction as the polarized light corresponding to its projected image, thus the observer's left eye perceives only the left stereoscopic image contribution to the fused image 20 and, similarly, the observer's right eye perceives only the optical information from the right stereoscopic image 14 which appears in the fused image 20. This can readily be achieved with conventional polarizing light projecting and filtering systems and this constitutes a preferred embodiment of the invention. For illustration purposes, polarized light filters are depicted by vertical and horizontal shading of filters 26 and 28, respectively. Such shading would not appear on the filters, which instead would be smooth surfaced transparent sheets such as depicted for the encoding filters 15 and 17 of filter 13. Alternatively, although less preferred, is the use of colored filters of monochromatic wave length, e.g., a red filter for the left eye and blue filter for the right eye, corresponding to similar monochromatic light encoding of the left and right stereoscopic images, respectively.

Figure 2:
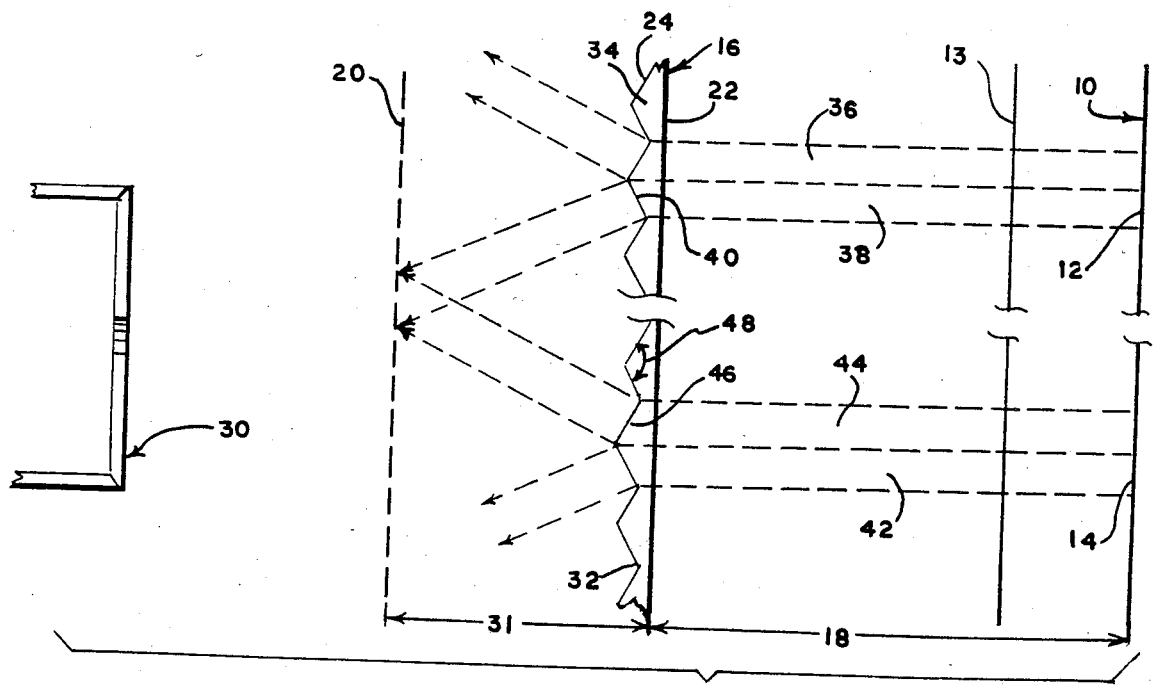
FIG. 2 is a partial sectional view of the Fresnel prism illustrating the mechanism of image direction through that lens.

Referring now to FIG. 2, the Fresnel prism and the mechanism by which this prism fuses the separate left and right stereoscopic images into a unitary image will be described in greater detail. As shown in FIG. 2, the Fresnel prism 16 is positioned a distance 18 in front of the screen 10 at a distance from screen 10 which can be varied, as desired, for the particular application. As previously described in FIG. 1, filter 13 functions to discriminate the presentation of the left image 12 and right image 14 to the observer's corresponding eyes.

The Fresnel prism 16 has a smooth or planar face 22' and an opposite faceted face 24. As also previously mentioned, the faceted face is preferably formed by a plurality of V-grooves 32 which are straight and parallel and are evenly spaced across the faceted face 24 of prism 16. This subdivides the prism 16 into a like plurality of parallel and evenly spaced, individual prisms 34. In the drawings, the size and spacing of the individual prisms is greatly increased for illustration purposes. Preferably, the V-grooves are spaced as closely across the face 24 of prism 16 as economically possible with conventional manufacturing techniques. Typically, prisms can be manufactured having from 20 to about 500 prisms per linear inch of distance along the faceted face of the prism 16. Preferably, the prisms are spaced sufficiently close to provide from 50 to about 200 prisms per linear inch. The greater number of prisms per linear inch is preferred because of the greater resolution achieved when using a higher number of prisms. If desired, however, any resolution difficulties with the Fresnel prism can be overcome in a manner described hereinafter with reference to FIG. 9.

The mechanism of light transmission which achieves fusion of the separate left and right images 12 and 14 into a unitary virtual image 20 is also illustrated in FIG. 2. As there illustrated, very narrow bands of each of the images are either converged or diverged by the Fresnel prism 16. Thus, the narrow band 36 of the left stereoscopic image 12 will be diverged from the field of view of the observer while the immediately adjacent very thin band 38 of that image will be converged by the prism face 40 of the Fresnel prism 16. A similar effect occurs with respect to the right stereoscopic image 14. Again, a very narrow band 42 of this image will be diverged while the immediately adjacent narrow band 44 will be converged by the individual prism 46. The converged bands of each stereoscopic image will fuse in front of Fresnel prism 16 at distance 31 corresponding to the face angles of each of the individual prisms such as 40 and 46 of the Fresnel prism 16.

The converged bands of each stereoscopic image fusing at distance 31 from prism 16 have previously been encoded as they passed through encoding filter 13, as described in detail in FIG. 1. The observer, not shown, wearing encoded glasses 30, will, therefore, see fused image 20, with each eye perceiving only its respective corresponding image. The left eye of the observer only sees encoded left image 12 and the right eye of the observer only sees encoded right image 14. The result is the construction, in the observer's mind, of a true stereoscopic illusion 20.

The spacing 18 between the display screen 10 and the Fresnel prism 16 is a variable which is determined by the face angles of the individual prisms such as 40 and 46 of the Fresnel prism 16. The face angle 48 of these prisms can be from about 45 to about 165 degrees, preferably from about 80 to about 115 degrees. The smaller the value of the face angle, the closer the spacing 18 between the projection screen 10 and the Fresnel prism 16. In typical applications for stereoscopic observation of images on a television monitor, this spacing 18 can be from about 6 to 18 inches, depending on the face angle 48. As previously mentioned, the resolution of the fused stereoscopic image will vary directly with the density of closeness of spacing of the individual prisms, typically 40 and 46.

FIG. 3 illustrates the invention as described in FIG. 1, with the addition of magnification lens 55 positioned between the observer's decoding glasses 30 and the fused image 20. Lens 55 increases the size of the perceived stereoscopic image. Lens 55 can be of typical solid lens design, or can be a standard Fresnel magnifier.

Referring now to FIG. 4, a section through an alternative Fresnel prism is illustrated. Since the individual prisms of Fresnel prism 16 diverge and converge narrow bands (illustrated in FIG. 2 as 36, 38, 42, and 44, of stereoscopic images 12 and 14), it is possible to employ a Fresnel lens 41 which has continuously varied face angles for its individual prisms, instead of Fresnel prism 16, which has individual prisms of uniform, unvaried face angles. In FIG. 4, the variable face angles of the Fresnel prism are symmetrical about the center axis 43, with equally varying face angles at either side of said axis. For example, face angles 45 and 47 are equal, and face angles 49 and 51 are equal, since each of the respective pair of prisms is equidistant to center axis 43. This design provides increasingly greater refraction of the image segments as the distance of the prisms from center axis 43 is increased. The resultant fused image 20 as described in FIG. 2 would therefore appear enlarged, and lens 41 would be performing, optically, as a magnifier and a converging refractory prism. If lens 41 is of similar longitudinal V-groove design as Fresnel lens 16 in FIGS. 1 and 2, the resultant magnification will be cylindrical. If, however, lens 41 is of the concentric V-groove design as later described herein in FIG. 5, the resultant magnification would be normal.

The variation of face angles of lens 41 does not impair its convergence and divergence activity. Lens 41, therefore, can be substituted for Fresnel prism 16 of FIG. 3, and will serve a dual purpose in the invention of magnification and image convergence and divergence, thereby obviating the necessity of a separate magnification lens 55 as previously described in FIG. 3.

Figure 11:
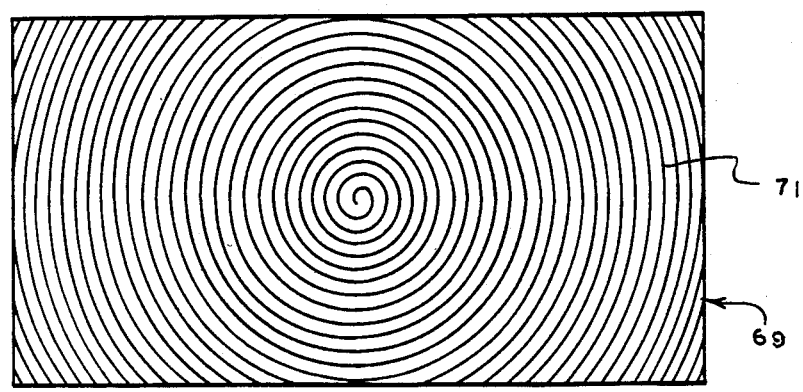
FIG. 11 illustrates an alternative Fresnel prism lens of a continuous spiral groove with equal face angles.

While the invention has been described with reference to the illustrated and preferred use of a Fresnel prism having a plurality of parallel and straight V-grooves to define therebetween a like plurality of evenly spaced, straight, triangular prisms, other Fresnel prism embodiments can be employed. FIG. 5 illustrates an alternative Fresnel prism in which a plurality of concentric V-grooves 70 are formed on the faceted face 72 of the Fresnel prism 68. Each V-groove will subdivide the faceted face 72 into a plurality of concentric, circular prisms having the form of annular rings with triangular cross-sections. This particular embodiment of a Fresnel prism is bipolar, i.e., the prism can be used in the same orientation to observe laterally placed, side-by-side, stereoscopic images as in FIG. 1. or to observe vertically displayed side-by-side stereoscopic images as described later herein in FIG. 6. Alternative to concentric annular prisms, a single, continuous spiral V-groove can be used to define a single, helical prism having a triangular cross-section, as shown in FIG. 11 as prism 69 with the spiral groove 71. This prism would function similarly to prism 68 in FIG. 5.

Figure 12:
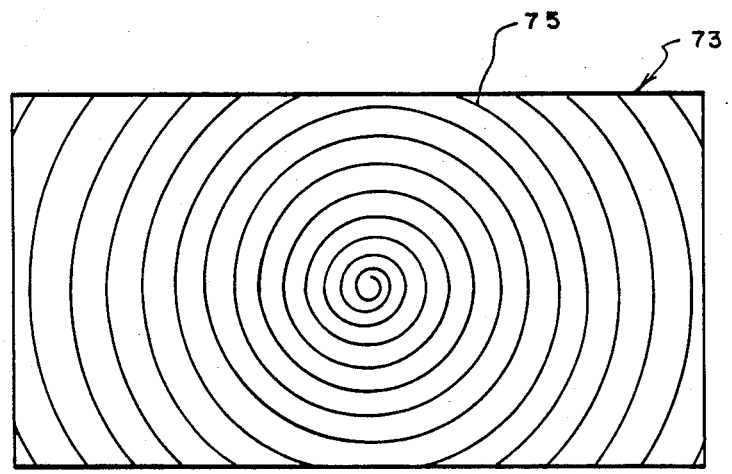
FIG. 12 illustrates an alternative Fresnel prism lens of a continuous spiral groove with continuously varying face angles to effect magnification.

The faceted face of prism 68 can be identical V-grooves, as illustrated in FIG. 2, which illustrates a cross-section of prism 16. In this embodiment, prism 68 would not cause any magnification. Prism 68 can also be formed with concentric rings of a regular variation in the face angles as described with reference to FIG. 4 which would also be a sectional view through such a prism lens. The prism 68 would then magnify as well as fuse the images passing through it, functioning as a Fresnel lens and as a Fresnel prism. This would also work with the helical ring design lens, wherein the face angle variation would be varied continuously along the helical path of its V-groove, as shown in FIG. 12 as prism 73 with the spiral groove 75.

Figure 6:
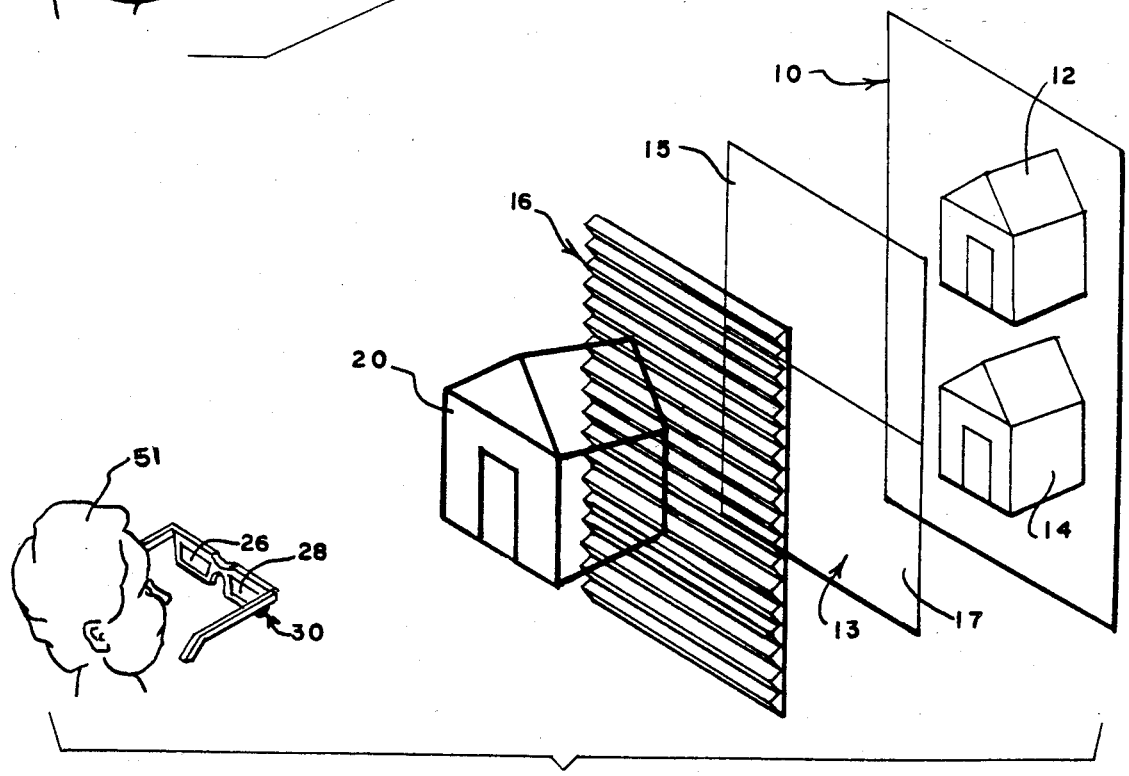
FIG. 6 illustrates an alternative viewing system of the invention with vertically stacked images.

Referring now to FIG. 6, an alternative embodiment of the invention is illustrated wherein screen 10 receives or displays vertically stacked images 12 and 14 respectively. Vertically stacking of stereoscopic images is, currently, the most popular recording method employed in motion picture stereoscopy. Fresnel prism 16 which is employed in FIG. 6 is substantially identical to that described with reference to FIGS. 1 through 4, however, the prism is rotated 90 degrees from the position previously illustrated to correspond to the vertical stacking of stereoscopic images 12 and 14. The result is the same, images 12 and 14 are encoded left and right, respectively, through filter 13, pass through Fresnel prism 16 and appear as fused, encoded image 20. The observer 51 wears a pair of binocular glasses 30 with decoding filters 26 and 28, as described in FIG. 1 and the stereoscopic image perception result is the same as previously described.

Figure 7:
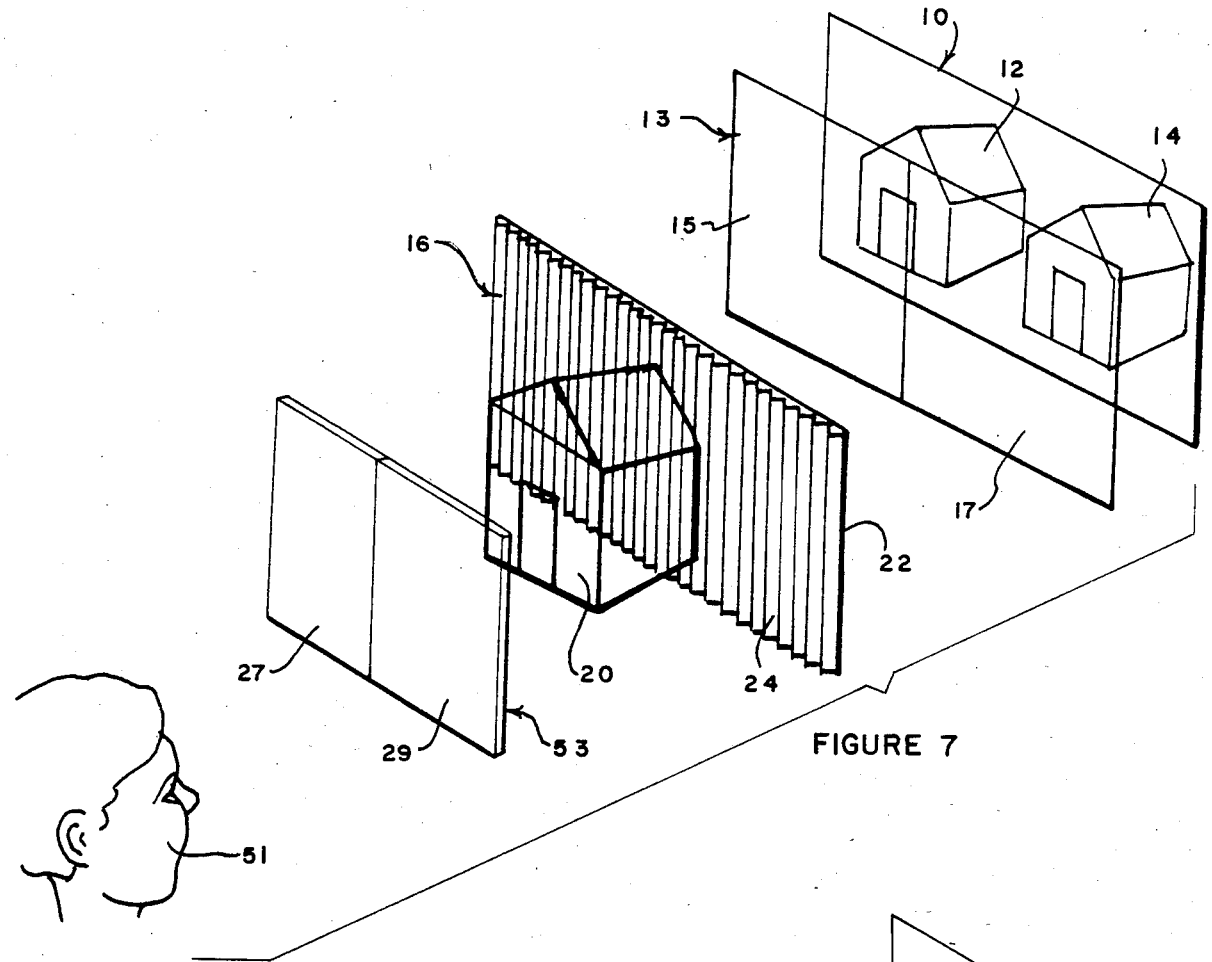
FIG. 7 illustrates an alternative viewing system of the invention with a distal decoding window.

Referring now to FIG. 7, there is illustrated an embodiment of the invention wherein the observer 51 does not wear binocular glasses with decoding filters. Instead, a window 53 having decoding filters 27 and 29 is positioned in front of the viewer 51, and these filters function in identical manner as the ocular eyepiece filters 26 and 28 described in reference to FIG. 1. The only difference is that the observer 51 need not wear any glasses but only needs to position himself such that each line of sight from his eyes is directed separately through the corresponding filter 27 or 29. This embodiment may be more desirable in the instance wherein the observer 51 wears glasses with corrective lenses.

Figure 8:
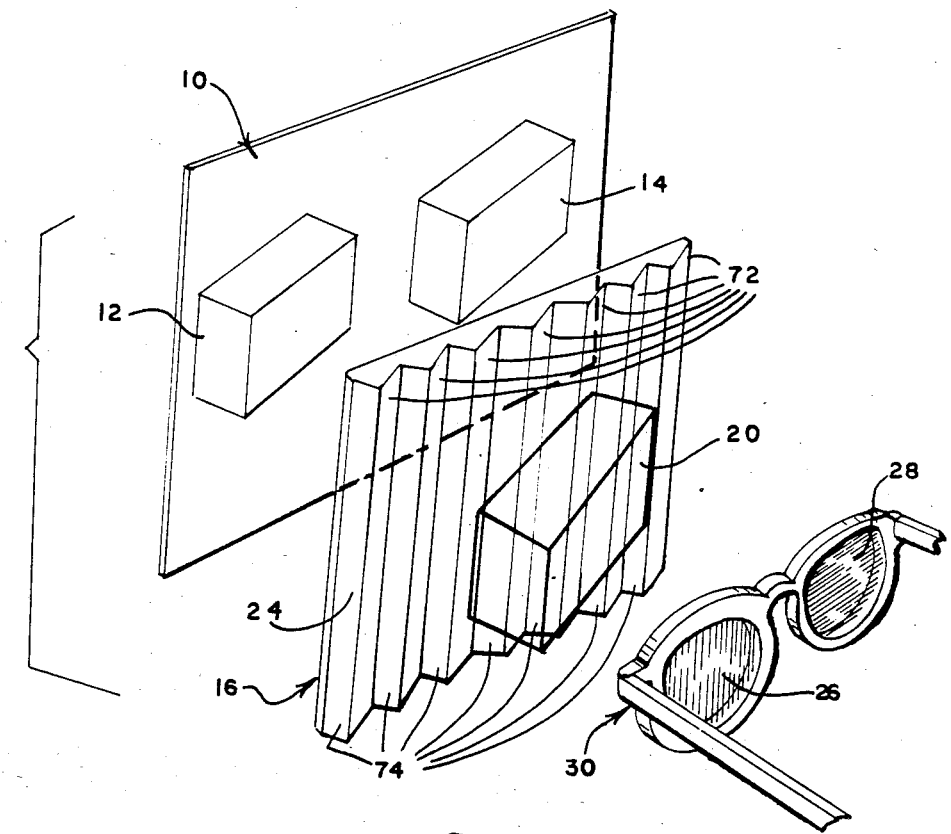
FIG. 8 illustrates a partial perspective view of the system with the encoding means integral with the prism lens.

Referring now to FIG. 8, there is illustrated an embodiment of the invention wherein the encoding filter medium is integral with the Fresnel lens. In previous embodiments, particularly as described in FIG. 1, the encoding filter 13 was positioned at any convenient spacing between Fresnel prism 16 and image display screen 10. In FIG. 8, each face of Fresnel prism 16 carries the appropriate encoding filter directly on, or immediately in front of, its grooved surface 24, thereby obviating the necessity of a separate encoding filter. Alternative prism surfaces 72 and 74 are coated or covered with respective polarized, or red and green, encoding filters. The observer, not shown, wearing binocular glasses 30 with decoding filters 26 and 28, thereby perceives the fused image 20, with each eye seeing its corresponding left or right image. The resultant stereoscopic perception is identical to that previously described herein.

Figure 9:
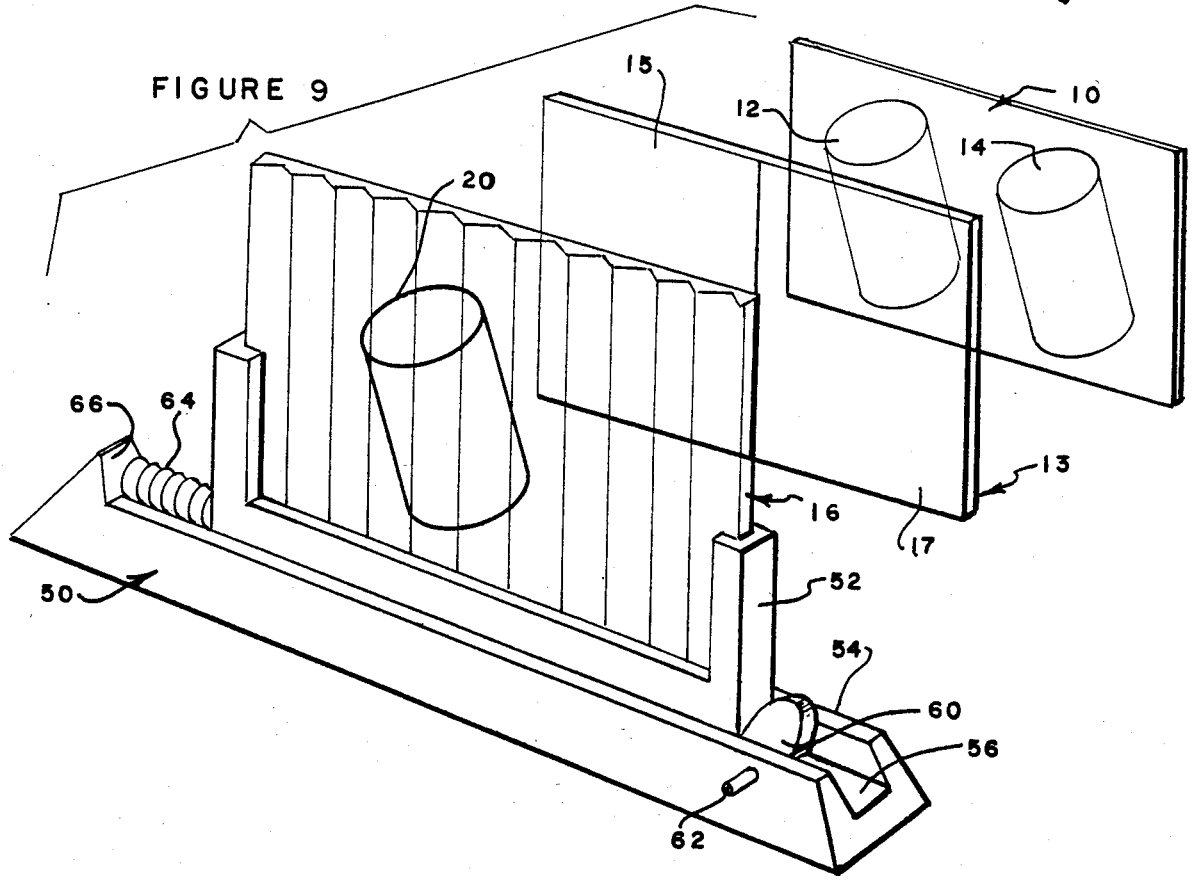
FIG. 9 illustrates a method of vibrating the imagefusing Fresnel prism.

FIG. 9 illustrates another embodiment in which the resolution and clarity of the perceived image 20 is enhanced. In this application, the Fresnel prism 16 is mounted on a reciprocating vibrator generally depicted as 50. The vibrator includes a frame 52 which receives the Fresnel prism 16 and is, in turn, slidably received within stand 54. The stand 54 has a suitable support base and a track 56 which is located parallel to the image screen 10. The Fresnel prism 16 is thus supported by the base in a plane parallel to screen 10. The vibrator 50 is provided with a reciprocating drive mechanism, e.g., a rotatably driven cam 60 mounted on drive shaft 62, and the frame 52 is resiliently biased to one side, opposing the action of the cam 60 by resilient means in the form of a compression spring 64 that is captured between the frame 52 and a spring stop 66 carried by stand 54. Virtually any oscillation of said Fresnel prism will improve the resolution of the resultant fused image 20 as illustrated in FIG. 1. Preferably, the cam drive is driven at a rotational velocity to oscillate the Fresnal prism 16 at a frequency from 10 to about 40 cycles per second. The oscillation results in the greater resolution and higher brilliance of the fused stereoscopic image. The oscillation as described herein can also be vertically oriented for employment in a stereoscopic display similar to as described in FIG. 6.

Figure 10:
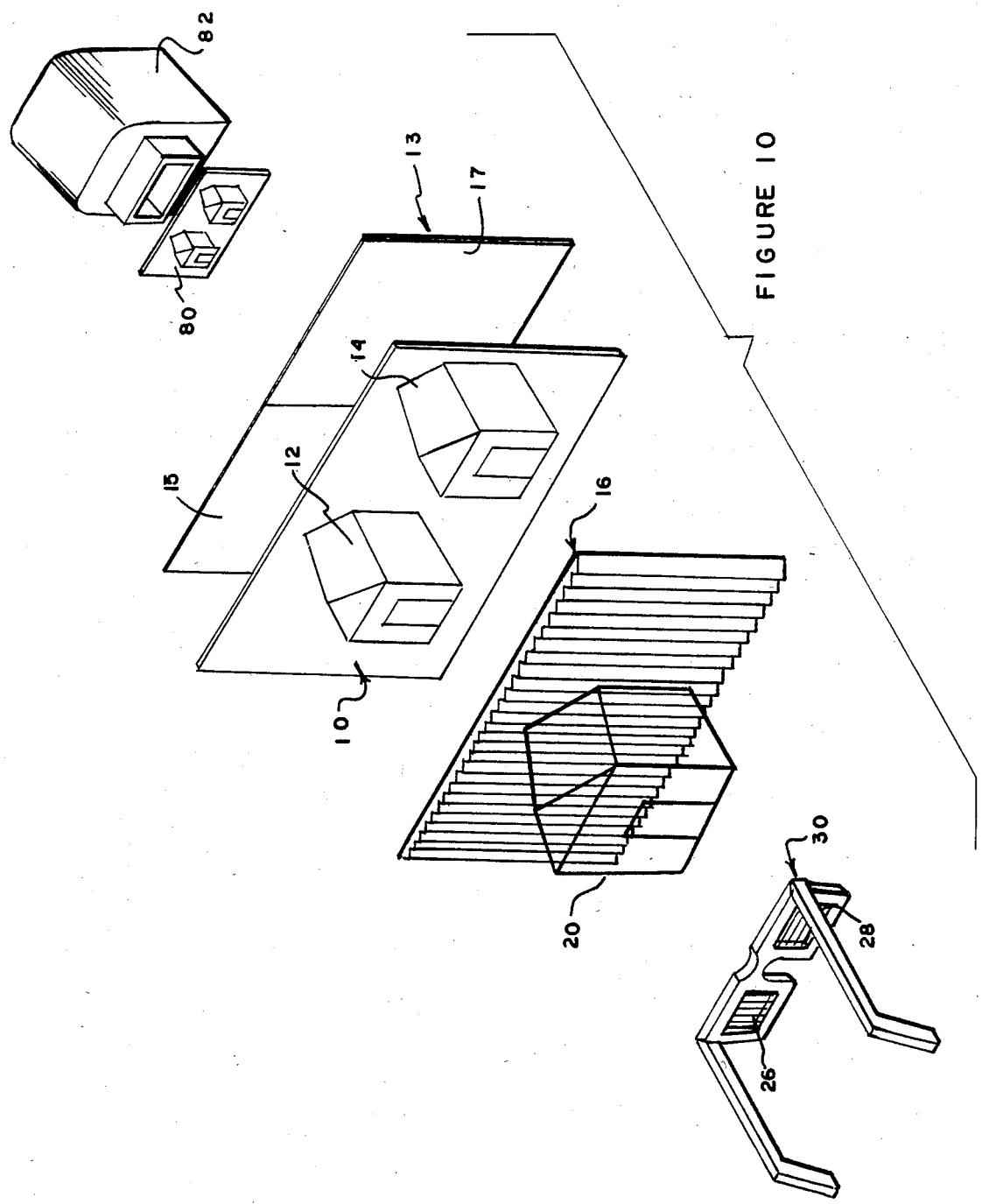
FIG. 10 illustrates the sytem wherein the images are projected onto the display screen with prior encoding of said images.

FIG. 10 illustrates an embodiment of the invention wherein left and right respective stereoscopic images 12 and 14 are encoded prior to their display on screen 10. In this embodiment, screen 10 can be of translucent material such as matte surface acetate sheet or translucent acrylic or etched glass. Encoding filter medium 13 with right and left image filters 15 and 17 is positioned behind screen 10 to intercept the projected images 12 and 14 as they are projected from their recorded source 80, typically a stereo transparency, towards said screen 10. The images can be projected onto the rear of screen 10 by a conventional projection means 82 having a projection light source and lenses, not shown. The screen 10 displays the stereoscopic images 12 and 14 already encoded, and the observer wears binocular glasses 30 with decoding filters 26 and 28 to view the image 20 as it is fused in space by Fresnel prism lens 16 as previously described. This embodiment, FIG. 10, is also applicable to front projection displays and in such application, screen 10 can have an opaque surface. This embodiment, particularly with polarized encoding, is applicable to projection television systems.

The invention is applicable to front projection and viewing by observer 100 using either monochromic or polarized light encoding. The invention is also applicable to back projection and viewing by observer 102 using a translucent screen surface. The embodiments shown in FIGS. 1 through 12 are thus adaptable to projection television sets. While the invention has been illustrated with the left and right stereoscopic images displayed side-by-side in horizontal or vertical arrays, any other pre-selected array of the images on the screen can be used.

The invention has been described with reference to the illustrated and presently preferred embodiments. It is not intended that the invention be unduly limited by this disclosure of presently preferred embodiments. Instead, it is intended that the invention be defined by the means, and their obvious equivalents, set forth in the following claims.

What is claimed is:

1. A stereoscopic viewing and display system comprising:
   (A) an imaging surface on which left and right stereoscopic images are displayed in adjacent array;
   (B) light encoding means to encode said images with left and right image information;
   (C) a thin face prism having one smooth surface and one faceted surface, said faceted surface comprising a plurality of straight, equally spaced individual prisms having a face angle from 25 to 135 degrees and spaced between 20 and 500 prisms per inch, and said thin face prism being positioned a distance in front of said imaging surface to fuse the right and left images; and
   (D) an optical decoding filter medium for placement in front of an observer to decode said left and right stereoscopic images and confine the transmission of each of said left and right images to the respective left and right eye of said observer.

2. The stereoscopic viewing and display system of claim 1 wherein a magnification lens is positioned in front of the observer to effect magnification.

3. The stereoscopic viewing and display system of claim 1 wherein said right and left stereoscopic images are displayed laterally side-by-side.

4. The stereoscopic viewing and display system of claim 1 wherein said right and left stereoscopic images are displayed vertically side-by-side.

5. The stereoscopic viewing and display system of claim 1 wherein said encoding means is positioned between said imaging surface and said thin face prism.

6. The stereoscopic viewing and display system of claim 1 wherein said optical encoding means comprises monochromatic light filters of first and second preselected colors.

7. The stereoscopic viewing and display system of claim 6 wherein said optical decoding filter medium comprises monochromatic light filters of said preselected first and second colors.

8. The stereoscopic viewing and display system of claim 7 wherein said monochromatic light filters are mounted in a pair of binocular glasses worn by the observer, with each eye having its line of sight through one of said filters.

9. The stereoscopic viewing and display system of claim 1 wherein said optical encoding means comprises a pair of polarizing light left and right encoding filters mounted with their light polarizing directions orthogonal to each other.

10. The stereoscopic viewing and display system of claim 9 wherein said decoding filter medium comprises a pair of polarizing light filters mounted in the same direction as their respective left and right encoding filters.

11. The stereoscopic viewing and display system of claim 9 wherein said pair of polarizing light left and right encoding filters are mounted in a pair of binocular glasses worn by the observer, with each eye having its line of sight through one of said filters.

12. The stereoscopic viewing and display system of claim 1 wherein said decoding filter medium is a filter plate having a pair of side-by-side optical filters and is positioned in front of the observer, in the lines of sight of said imaging surface.

13. The stereoscopic viewing and display system of claim 1 wherein said imaging surface is a television video display monitor.

14. The stereoscopic viewing and display system of claim 1 wherein said imaging surface is translucent for rear projection and frontal display of said left and right stereoscopic images.

15. The stereoscopic viewing and display system of claim 1 wherein said prism is positioned with its faceted surface facing said imaging surface.

16. The stereoscopic viewing and display system of claim 1 wherein said prism is positioned with its smooth face facing said imaging surface.

17. The stereoscopic viewing and display system of claim 1 wherein said prism and said encoding filter are combined into one element, with said prism having, optical right and left encoding filters on alternate prism sides.

18. The stereoscopic viewing and display system of claim 17 wherein polarized light filters are coated onto alternate faces of the prism faces of said prism with orthogonal directions of polarization.

19. The stereoscopic viewing and display system of claim 17 wherein monochromatic light filters of first and second preselected colors are coated onto alternate faces of the prism faces of said prism.

20. The stereoscopic viewing and display system of claim 1 including projection means to project said left and right stereoscopic images onto said imaging surface.

21. The stereoscopic viewing and display system of claim 20 wherein a magnification lens is positioned in front of the observer to effect magnification.

22. The stereoscopic viewing and display system of claim 20 wherein said right and left stereoscopic images are displayed laterally side-by-side.

23. The stereoscopic viewing and display system of claim 20 wherein said right and left stereoscopic images are displayed vertically side-by-side.

24. The stereoscopic viewing and display system of claim 20 wherein said encoding means is positioned between said imaging surface and said thin face prism.

25. The stereoscopic viewing and display system of claim 20 wherein said optical encoding means comprises monochromatic light filters of first and second preselected colors.

26. The stereoscopic viewing and display system of claim 25 wherein said monochromatic light filters are mounted between said projection means and said imaging surface.

27. The stereoscopic viewing and display system of claim 26 wherein said optical decoding filter medium comprises monochromatic light filters of said preselected first and second colors.

28. The stereoscopic viewing and display system of claim 20 wherein said optical encoding means comprises a pair of polarizing light filters mounted with their light polarizing directions orthogonal to each other.

29. The stereoscopic viewing and display system of claim 28 wherein said pair of polarizing light filters are mounted between said projection means and said imaging surface.

30. The stereoscopic viewing and display system of claim 29 wherein said decoding filter medium comprises a pair of polarizing light filters mounted in the same direction as their respective left and right encoding filters.

31. The stereoscopic viewing and display system of claim 20 wherein said decoding filtering medium is a pair of optical light filters mounted in a pair of binocular glasses worn by the observer, with each eye having its line of sight through one of said filters.

32. The stereoscopic viewing and display system of claim 20 wherein said decoding filter medium is a filter plate having a pair of side-by-side optical filters and is positioned in front of the observer, in his lines of sight of said imaging surface.

33. The stereoscopic viewing and display system of claim 20 wherein said imaging surface is a television video display monitor.

34. The stereoscopic viewing and display system of claim 20 wherein said imaging surface is translucent for rear projection and frontal display of said left and right stereoscopic images.

35. The stereoscopic viewing and display system of claim 20 wherein said prism is positioned with its faceted surface facing said imaging surface.

36. The stereoscopic viewing and display system of claim 20 wherein said prism is positioned with its smooth face facing said imaging surface.

37. A stereoscopic viewing and display system comprising:
(A) an imaging surface on which left and right stereoscopic images are displayed in adjacent array;
(B) light encoding means to encode said images with left and right image information;

(C) a thin face prism having one smooth surface and one faceted surface, said faceted surface comprising a plurality of concentric ringed prisms of equal face angles from 25 to 135 degrees and spaced between 20 and 500 prisms per inch, and said thin face prism being positioned a distance in front of said imaging surface to fuse the right and left images; and (D) an optical decoding filter medium for placement in front of an observer to decode said left and right stereoscopic images and confine the transmission of each of said left and right images to the respective left and right eye of said observer.

38. A stereoscopic viewing and display system comprising:

(A) an imaging surface on which left and right stereoscopic images are displayed;

(B) light encoding means to encode said images with left and right image information;

(C) a thin face prism having one smooth surface and one faceted surface, said faceted surface comprising a plurality of concentric ringed closely spaced prisms of varying face angles from 25 to 135 degrees to effect magnification, and positioned a distance in front of said imaging surface to fuse the right and left images; and (D) an optical decoding filter medium for placement in front of an observer to decode said left and right stereoscopic images and confine the transmission of each of said left and right images to the respective left and right eye of said observer.

39. A stereoscopic viewing and display system comprising:

(A) an imaging surface on which left and right stereoscopic images are displayed in adjacent array;

(B) light encoding means to encode said images with left and right image information;

(C) a thin face prism having one smooth surface and one faceted surface, said faceted surface comprising a continuous spiral prism with a continuous, equal face angle from 25 to 135 degrees and spaced between 20 and 500 prisms per inch, and said thin face prism being positioned a distance in front of said imaging surface to fuse the right and left images; and (D) an optical decoding filter medium for placement in front of an observer to decode said left and right stereoscopic images and confine the transmission of each of said left and right images to the respective left and right eye of said observer.

40. A stereoscopic viewing and display system comprising:

(A) an imaging surface on which left and right stereoscopic images are displayed;

(B) light encoding means to encode said images with left and right image information;

(C) a thin face prism having one smooth surface and one faceted surface, said faceted surface comprising a continuous spiral prism surface of a continuously varying face angle from 25 to 135 degrees to effect magnification, and said thin face prism being positioned a distance in front of said imaging surface to fuse the right and left images; and (D) an optical decoding filter medium for placement in front of an observer to decode said left and right stereoscopic images and confine the transmission of each of said left and right images to the respective left and right eye of said observer.

41. The stereoscopic viewing and display system of any of claims 1, 37, 38, 39 or 40 wherein said individual prisms are spaced between 50 and 200 prisms per inch.

42. A stereoscopic viewing and display system comprising:

(A) an imaging surface on which left and right stereoscopic images are displayed;

(B) light encoding means to encode said images with left and right image information;

(C) a thin face prism having one smooth surface and one faceted surface, said faceted surface comprising straight and parallel closely spaced prisms of varying face angles from 25 to 135 degrees to effect magnification, and positioned a distance in front of said imaging surface to fuse the right and left images; and (D) optical decoding filter medium for placement in front of an observer to decode said left and right stereoscopic images and confine the transmission of each of said left and right images to the respective left and right eye of said observer.

43. A stereoscopic viewing and display system comprising:

(A) an imaging surface on which left and right stereoscopic images are displayed;

(B) light encoding means to encode said images with left and right image information;

(C) a thin face prism having one smooth surface and one faceted surface, said faceted surface comprising a plurality of closely spaced prisms having a face angle from 25 to 135 degrees and positioned a distance in front of said imaging surface to fuse the right and left images;

(D) an optical decoding filter medium for placement in front of an observer to decode said left and right stereoscopic images and confine the transmission of each of said left and right images to the respective left and right eye of said observer; and (E) a reciprocating mechanism with said prism mounted thereon and including means to cause oscillation of said prism in a plane parallel to the imaging surface.

44. A stereoscopic viewing and display system comprising:

(A) an imaging surface on which left and right stereoscopic images are displayed;

(B) light encoding means to encode said images with left and right image information;

(C) a thin face prism having one smooth surface and one faceted surface, said faceted surface comprising a plurality of concentric ringed prisms of equal face angles from 25 to 135 degrees and positioned a distance in front of said imaging surface to fuse the right and left images;

(D) an optical decoding filter medium for placement in front of an observer to decode said left and right stereoscopic images and confine the transmission of each of said left and right images to the respective left and right eye of said observer; and (E) projection means to project said left and right stereoscopic images onto said imaging surface.

45. A stereoscopic viewing and display system comprising:

(A) an imaging surface on which left and right stereoscopic images are displayed;

(B) light encoding means to encode said images with left and right image information;

(C) a thin face prism having one smooth surface and one faceted surface, said faceted surface comprising a plurality of concentric ringed prisms of varying face angles from 25 to 135 degrees to effect magnification, and positioned a distance in front of said imaging surface to fuse the right and left images;

(D) an optical decoding filter medium for placement in front of an observer to decode said left and right stereoscopic images and confine the transmission of each of said left and right images to the respective left and right eye of said observer; and (E) projection means to project said left and right stereoscopic images onto said imaging surface.

46. A stereoscopic viewing and display system comprising:

(A) an imaging surface on which left and right stereoscopic images are displayed;

(B) light encoding means to encode said images with left and right image information;

(C) a thin face prism having one smooth surface and one faceted surface, said faceted surface comprising a continuous spiral prism surface with a continuous equal face angle from 25 to 135 degrees, and positioned a distance in front of said imaging surface to fuse the right and left images;

(D) an optical decoding filter medium for placement in front of an observer to decode said left and right stereoscopic images and confine the transmission of each of said left and right images to the respective left and right eye of said observer; and (E) projection means to project said left and right stereoscopic images onto said imaging surface.

47. A stereoscopic viewing and display system comprising:

(A) an imaging surface on which left and right stereoscopic images are displayed;

(B) light encoding means to encode said images with left and right image information;

(C) a thin face prism having one smooth surface and one faceted surface, said faceted surface comprising a continuous spiral prism surface with a continuously varying face angle from 25 to 135 degrees, to effect magnification, and positioned a distance in front of said imaging surface to fuse the right and left images;

(D) an optical decoding filter medium for placement in front of an observer to decode said left and right stereoscopic images and confine the transmission of each of said left and right images to the respective left and right eye of said observer; and (E) projection means to project said left and right stereoscopic images onto said imaging surface.

48. A stereoscopic viewing and display system comprising:

(A) an imaging surface on which left and right stereoscopic images are displayed;

(B) light encoding means to encode said images with left and right image information;

(C) a thin face prism having one smooth surface and one faceted surface, said faceted surface comprising straight, equally spaced individual prisms of equal face angles from 25 to 135 degrees, and spaced between 50 and 200 prisms per inch, and positioned a distance in front of said imaging surface to fuse the right and left images;

(D) an optical decoding filter medium for placement in front of an observer to decode said left and right stereoscopic images and confine the transmission of each of said left and right images to the respective left and right eye of said observer; and (E) projection means to project said left and right stereoscopic images onto said imaging surface.

49. A stereoscopic viewing and display system comprising:

(A) an imaging surface on which left and right stereoscopic images are displayed;

(B) light encoding means to encode said images with left and right image information;

(C) a thin face prism having one smooth surface and one faceted surface, said faceted surface comprising straight and parallel prisms of varying face angles from 25 to 135 degrees to effect magnification, and positioned a distance in front of said imaging surface to fuse the right and left images;

(D) an optical decoding filter medium for placement in front of an observer to decode said left and right stereoscopic images and confine the transmission of each of said left and right images to the respective left and right eye of said observer; and (E) projection means to project said left and right stereoscopic images onto said imaging surface.

50. A stereoscopic viewing and display system comprising:

(A) an imaging surface on which left and right stereoscopic images are displayed;

(B) a thin face prism having one smooth surface and one faceted surface, said faceted surface comprising a plurality of closely spaced prisms having a face angle from 25 to 135 degrees and positioned a distance in front of said imaging surface to fuse the right and left images and optical right and left encoding filters on alternate prism sides to encode said images with left and right image information;

(D) an optical decoding filter medium for placement in front of an observer to decode said left and right stereoscopic images and confine the transmission of each of said left and right images to the respective left and right eye of said observer; and (E) projection means to project said left and right stereoscopic images onto said imaging surface.

51. The stereoscopic viewing and display system of claim 46 wherein polarized light filters are coated onto alternate faces of the prism faces of said prism with orthogonal directions of polarization.

52. The stereoscopic viewing and display system of claim 48 wherein monochromatic light filters of first and second preselected colors are coated onto alternate faces of the prism faces of said prism.

53. A stereoscopic viewing and display system comprising:

(A) an imaging surface on which left and right stereoscopic images are displayed;

(B) light encoding means to encode said images with left and right image information;

(C) a thin face prism having one smooth surface and one faceted surface, said faceted surface comprising a plurality of closely spaced prisms having a face angle from 25 to 135 degrees and positioned a distance in front of said imaging surface to fuse the right and left images;

(D) an optical decoding filter medium for placement in front of an observer to decode said left and right stereoscopic images and confine the transmission of each of said left and right images to the respective left and right eye of said observer;

(E) projection means to project said left and right stereoscopic images onto said imaging surface; and (D) a reciprocating mechanism with said prism mounted thereon and including means to cause oscillation of said prism in a plane parallel to the imaging surface.

54. A stereoscopic viewing and display system comprising:
  (A) an imaging surface on which left and right stereoscopic images are displayed;
  (B) light encoding means to encode said images with left and right image information;
  (C) a thin face prism having one smooth surface and one faceted surface, said faceted surface comprising straight, equally spaced individual prisms of equal face angles from 25 to 135 degrees, and positioned a distance in front of said imaging surface to fuse the right and left images;
  (D) an optical decoding filter medium for placement in front of an observer to decode said left and right stereoscopic images and confine the transmission of each of said left and right images to the respective left and right eye of said observer; and
  (E) projection means to project said left and right stereoscopic images onto said imaging surface.

* * * * *